US011578827B2

(12) United States Patent
Wolin et al.

(10) Patent No.: US 11,578,827 B2
(45) Date of Patent: Feb. 14, 2023

(54) FIRE PROTECTION SPRINKLER WITH A PUSH-IN CONNECTION

(71) Applicant: The Reliable Automatic Sprinkler Co., Inc., Liberty, SC (US)

(72) Inventors: Steven D. Wolin, Liberty, SC (US); George S. Polan, Liberty, SC (US)

(73) Assignee: The Reliable Automatic Sprinkler Co. Inc., Liberty, SC (US)

( * ) Notice: Subject to any disclaimer, the term of this patent is extended or adjusted under 35 U.S.C. 154(b) by 206 days.

(21) Appl. No.: 17/063,756

(22) Filed: Oct. 6, 2020

(65) Prior Publication Data

US 2021/0116062 A1 Apr. 22, 2021

Related U.S. Application Data

(60) Provisional application No. 62/923,931, filed on Oct. 21, 2019.

(51) Int. Cl.
*F16L 37/133* (2006.01)
*F16L 37/138* (2006.01)
(Continued)

(52) U.S. Cl.
CPC ............ *F16L 37/133* (2013.01); *A62C 35/68* (2013.01); *A62C 37/08* (2013.01); *E03C 1/023* (2013.01); *F16L 37/138* (2013.01)

(58) Field of Classification Search
CPC ...... F16L 37/133; F16L 37/138; A62C 35/68; A62C 37/08; E03C 1/023
(Continued)

(56) References Cited

U.S. PATENT DOCUMENTS 5,002,318 A * 3/1991 Witter ................. F16L 27/1273
285/302
9,650,768 B2 5/2017 Johnson et al.
(Continued)

FOREIGN PATENT DOCUMENTS

DE 20120671 U1 4/2002
JP H07-190262 A 7/1995
(Continued)

OTHER PUBLICATIONS

Extended European Search Report dated Sep. 10, 2021, in European Patent Application No. 21160587.8.

*Primary Examiner* — Christopher S Kim
(74) *Attorney, Agent, or Firm* — Venable LLP

(57) ABSTRACT

A sprinkler with a push-in connection includes a sprinkler frame, an operating element, and a sealing cap. The sprinkler also includes one or more sealing gaskets and a retainer. Each such sealing gasket is located at least partially within a groove in the sprinkler frame. The retainer is also at least partially located within a groove in the sprinkler frame. The retainer connects to the internal bore of a welded outlet or a mechanical outlet when the sprinkler is installed in the outlet. The one or more gaskets seal against the internal bore of a welded outlet or a mechanical outlet when the sprinkler is installed in the outlet. The retainer is a spring mechanism so that the diameter of the retainer is reduced when the sprinkler is inserted into the internal bore of the outlet, and the retainer maintains pressure against the outlet internal bore.

15 Claims, 15 Drawing Sheets

(51) Int. Cl.
  *E03C 1/02* (2006.01)
  *A62C 35/68* (2006.01)
  *A62C 37/08* (2006.01)
(58) Field of Classification Search
  USPC .......................................................... 169/37
  See application file for complete search history.

(56) References Cited

U.S. PATENT DOCUMENTS 9,851,035 B2 12/2017 Hunt et al.
2005/0236166 A1 10/2005 Bentzien et al.
2011/0278026 A1 11/2011 Sterm

FOREIGN PATENT DOCUMENTS

WO 2007000023 A 1/2007
WO 2019051279 A1 3/2019

\* cited by examiner

FIRE PROTECTION SPRINKLER WITH A PUSH-IN CONNECTION

CROSS REFERENCE TO RELATED APPLICATION

This application is based on U.S. Provisional Patent Application No. 62/923,931, filed Oct. 21, 2019, which is incorporated herein by reference in its entirety.

BACKGROUND OF THE INVENTION

1. Field of the Invention

Our invention generally relates to a fire protection sprinkler with a push-in connection.

2. Related Art

Fire protection sprinklers conventionally are connected to a conduit to receive pressurized fire-extinguishing fluid, such as water. A typical sprinkler has a base with a threaded portion for connection to the conduit and an output orifice to output the fluid to provide fire control and/or suppression. The output orifice is sealed by a seal cap, which is held in place by a release mechanism. The release mechanism is designed to release the cap under predetermined conditions, thereby initiating the flow of fire-extinguishing fluid. A typical release mechanism includes a thermally-responsive element, e.g., a frangible bulb or fusible link, and may also include a latching mechanism.

Certain conventional sprinklers have a pair of arms that extend from the base portion and meet at a hub portion to form a frame. The hub portion is spaced apart from the output orifice of the base portion and is aligned with a longitudinal axis thereof. The hub portion may have a set-screw configured to apply a pre-tension force to the release mechanism. A deflector may be mounted on the hub, transverse to the output orifice, to provide dispersion of the output fluid.

Fire protection sprinklers may be mounted on a fluid conduit running along a ceiling and may either depend downward from the conduit, which is referred to as a "pendent" configuration, or may extend upward, which is referred to as an "upright" configuration. Alternatively, a sprinkler may be mounted on a wall, a certain distance below the ceiling, which is referred to as a "horizontal sidewall" configuration. Horizontal sidewall sprinklers have an output orifice that is oriented so that the fluid is output horizontally and sprays onto an area to be protected in front of the sprinkler. Upright sprinklers may be mounted on a "sprig" or "sprig-up", which is a supply line that extends vertically from the fluid conduit to supply a single sprinkler.

A sprig may be formed by attaching a short section of pipe (referred to as a "nipple") to a "tee" or butt-weld branch connection. A tee branch may be formed, for example, by attaching a mechanical tee to the pipe, which has a base that conforms to the pipe and a threaded or grooved portion that extends from the base. Butt-weld branches may be formed, for example, by welding a fitting to the supply pipe, such as a Weldolet® (Bonney Forge, Mount Union, Pa.), which is a forged steel fitting that conforms to the contour of the supply pipe. Typically, the sprinkler has been installed in a threaded connection at the end of the sprig. In the case of a branch connection having a grooved connection, the section of pipe may be an "adapter nipple", which is grooved at one end and a threaded port at the other end for receiving the threaded end of the sprinkler.

One of the disadvantages of the conventional sprig configuration is that it requires the use of a separate pipe section for each sprinkler, which increases the number of components in the system. This also adds to installation time, because it requires the separate steps of connecting the pipe section to the branch and connecting the sprinkler to the pipe section. This configuration also increases the probability of leakage, because it doubles the number of connections between the sprinklers and the conduits (i.e., it requires two connections per sprinkler). Furthermore, conventional upright sprinkler bodies are not configured to accommodate a grooved connection without an adapter. Moreover, threading the connections together is labor and time intensive.

Sprinklers generally may be categorized as "control mode" or "suppression mode". Control mode sprinklers are designed to limit the size of a fire by distribution of water, so as to decrease the heat release rate and pre-wet adjacent combustibles, while controlling ceiling gas temperatures to avoid structural damage. Suppression mode sprinklers are designed to sharply reduce the heat release rate of a fire and to prevent its regrowth by means of direct and sufficient application of water through the fire plume to the burning fuel surface.

The thermal sensitivity of a sprinkler is a measure of the rapidity with which the thermally-responsive release mechanism operates as installed in a specific sprinkler or sprinkler assembly. One measure of thermal sensitivity is the response time index (RTI) as measured under standardized test conditions. Sprinklers defined as fast response have a thermal element with an RTI of 50 $m \cdot s^{1/2}$ or less. Sprinklers defined as standard response have a thermal element with an RTI of 80 $m \cdot s^{1/2}$ or more.

"Specific application control mode storage" sprinklers, as defined in UL 199 ("Standard for Automatic Sprinklers for Fire-Protection Service," Underwriters' Laboratories, 11$^{th}$ Ed., Nov. 4, 2005), are designed for the protection of stored commodities, as specified in NFPA 13 ("Standard for the Installation of Sprinkler Systems," National Fire Protection Association, Inc., 2002 Edition), or particular end use limitations specified for the sprinkler (e.g., specific hazards or construction features). According to Section 3.6.2.12 of NFPA 13, a specific application control mode sprinkler (for storage use) is a type of spray sprinkler listed at a minimum operating pressure with a specific number of operating sprinklers for a given protection scheme. Such sprinklers may be used to protect storage of Class I through Class IV commodities, plastic commodities, miscellaneous storage, and other storage as specified in Chapter 12 of NFPA 13 (see Section 12.1.2.3).

Sections 8.5 and 8.6 of NFPA 13 specify requirements for the installation of standard pendent and upright sprinklers. In particular, Section 8.6.5.2.1.3 specifies requirements for the spacing of standard upright sprinklers with respect to obstructions that may interfere with the sprinkler spray pattern. However, as indicated in Section 8.6.5.2.1.8, these spacing requirements do not apply to upright sprinklers that are directly attached, i.e., attached without a sprig-up, to a supply pipe having a diameter of less than 3 inches. Thus, sprinklers that are designed to be installed without sprig-ups have the advantage of less stringent spacing requirements.

Sections 8.5 and 8.11 specify requirements for the installation of special application control mode sprinklers for storage applications. Section 8.11.5 specifies requirements for installation of special application control mode sprinklers near obstructions that may interfere with the sprinkler spray pattern. Section 8.11.5.2.2 states that sprinklers are permitted to be attached directly to branch lines less than 2 inches in diameter. Sprinklers may be directly attached to larger diameter branch lines, as well. However, certain minimum distances apply to the use of sprig-ups (or "riser nipples"). Specifically, sprinklers supplied by a riser nipple must elevate the sprinkler deflector a minimum of 13 inches from the centerline of a 2.5 inch pipe and a minimum of 15 inches from the centerline of a 3 inch pipe. Thus, sprinklers that are designed to be installed without sprig-ups have the advantage of allowing more flexibility in installation.

FIG. 1 shows a conventional upright sprinkler 100 having a body 101 with an extended portion 105, mounted on a supply pipe 103 using a threaded branch connection 106. The supply pipe 103 has a nominal inner diameter of, for example, 2" or 3" and an outer diameter (OD) of 2.375" or 3.5", respectively. The branch connection in this example has a height of 1.25" and a diameter of 1.90", and it may be used on either 2" or 3" supply pipes. As discussed above, a dimension, D2, may be defined between the underside of the deflector 160 and the top edge 170 of the body 101. The top edge 170 of the sprinkler body 101 has a diameter (W), and the hub 140 has a radius, X. A height, H, may be defined between the top of the deflector 160 and a center line of the supply pipe 103.

For comparison purposes, a similar set of dimensions may be defined for a conventional sprinkler positioned on a supply pipe. In such a case, the diameter, W, is defined by the width of the wrench boss (i.e., the distance between the flat edges of the wrench boss), which forms the top edge of the conventional sprinkler. The desired height, H, may be achieved by using a sprig-up, which may various configurations of pipe sections and adapters.

A shadow diameter, S, may be defined, which corresponds to the diameter of the conical-shaped, shadowed region at a particular distance beneath the sprinkler. To account for shadowing caused by the supply pipe 103 (as opposed to the structure of the sprinkler), the shadow diameter (S) is considered to have a baseline value corresponding to the diameter (OD) of the supply pipe 103. The baseline value may change, by an amount defined as ΔS, depending upon the particular dimensions of the sprinkler, as discussed below. The resulting composite shadow diameter (S'), which is based on the dimensions of the supply pipe and the sprinkler, is given by the expression: S'=S+ΔS. The value of S' may be less than, equal to, or greater than the baseline shadow diameter (S).

Enhanced protection extended coverage (EPEC) sprinklers are designed to meet the requirements of the Loss Prevention Certification Board (LPCB), which provides certification for sprinkler systems in the U.K. EPEC sprinklers are designed to provide protection for storage applications meeting Ordinary Hazard Group III criteria, in accordance with Technical Bulletin TB222. The relevant standards allow coverage of an area of 17.6 m$^2$, which corresponds to a sprinkler spacing of 4.2 m (about 13.8 ft). By contrast, standard (non-extended coverage) sprinklers provide a coverage area of 12 m$^2$, which corresponds to a spacing of 3.5 m (about 11.5 ft).

FIG. 2 shows a conventional enhanced protection extended coverage (EPEC) pendent sprinkler 200. The sprinkler 200 has a body 210 defining an axial fluid passage through the body. The top of the body has a threaded portion 220 on its outer surface to allow the sprinkler 200 to be connected to a conduit (not shown) for providing pressurized fire-extinguishing fluid, such as water, to an input end 225 of the fluid passage. The fluid passage has an output orifice 230 at the opposite end that is sealed by a seal cap 235. The input end 225 may have a diameter of, for example, ¾ inch NPT (national pipe thread). The sprinkler 200 may have a K-factor of, for example, 8.0 gpm/psi$^{1/2}$, which is defined by K=Q/√{square root over (p)}, where Q is the flow rate in gallons per minute and p is the residual pressure at the inlet of the sprinkler in pounds per square inch (which corresponds to a metric K-factor of 1151 pm/bar$^{1/2}$). Larger K-factors, for example 11.2 gpm/psi$^{1/2}$ (1611 pm/bar$^{1/2}$) or 14 gpm/psi$^{1/2}$ (2011 pm/bar$^{1/2}$), are also possible.

Two frame arms 240 extend from the lower portion of the body 210 and meet at a hub 245 positioned below and in axial alignment with the output orifice 230. A deflector 300 is positioned on the hub 245 so as to be impinged by the output fluid upon activation of the sprinkler 200. As further discussed below, the deflector 300 in this particular embodiment is a circular disk that is centered on and orthogonal to the axis of the fluid passage. The disk has a number of slots of varying length and orientation arrayed around its periphery.

A release mechanism having a thermally-responsive element, e.g., a frangible bulb 250, is positioned between the hub 245 and the seal cap 235 to hold the seal cap 235 in place over the output orifice 230. As shown in FIG. 2, the bulb 250 is positioned between the seal cap 235 and a set screw 255. The bulb 250 is designed to burst at the predetermined temperature, which in turn releases the seal cap 235 and allows the fluid to be output from the orifice 230. Of course, other types of release mechanisms may be used, including, but not limited to, for example, a fusible link assembly or a sensor, strut, and lever assembly.

FIGS. 3 to 5 show an embodiment of the deflector 300, which as noted above, is a circular disk having a number of slots of varying length and orientation arrayed around its periphery. The deflector is formed of metal, such as, for example, phosphor bronze, and has a radius of about 0.8 inches and a thickness of about 0.06 inches. In alternative embodiments, the radius may be between about 0.5 and about 1.1 inches, preferably, about 0.7 to 0.9 inches. The deflector is formed by stamping a thin piece of metal to form a flat, circular blank (not shown) with slots. The blank may be about 0.02 inches larger in diameter than the finished deflector, due to the bending of the edges, as discussed below.

The edges of the blank are curved or bent in a further process, so that the outer edges 310 of the deflector extend away from the outlet orifice 330. For example, as shown in FIG. 4, the edges 310 of the deflector may be bent to form an angle of about 14° with respect to the plane of the deflector (this angle may be between about 5° and about 30°, preferably about 10° to about 20°, in alternative embodiments), such that the deflector has a planar central portion 320 with a radius of about 0.65 inches. The central portion may have a radius of between about 0.4 and about 0.9 inches, preferably, about 0.6 to 0.7 inches. Alternatively, the edges may be left flat.

The positions of the slots may be described in terms of the approximate angle between each slot and section line 3-3, which extends horizontally though the planar view of the deflector 300 in FIG. 3. In the exemplary embodiment, there is a pair of "aligned slots" 325, which are cut out along section line 3-3, and extend to the outer edge 310 of the deflector. The aligned slots 325 are aligned with the plane of the frame arms 340. The aligned slots 325 have a radial length of about 0.35 inches (which is about 44% of the deflector radius). In alternative embodiments, the length of the aligned slots 325 may be between about 0.2 and about 0.6 inches, preferably about 0.3 to about 0.4 inches.

The width of the aligned slots is about 0.08 inches, which in alternative embodiments may vary about ±20%, preferably, about ±15%. The width of the aligned slots is designed to provide a desired amount of additional water to the areas under the frame arms 340, i.e., the area almost directly below the sprinkler 300. This helps counteract the "shadowing effect," which is the tendency of the frame arms 340, depending upon their width, to block water output to the area below the frame arms 340. By contrast, extending the length of the aligned slots 325 toward the center of the deflector might result in a structurally weakened deflector, due to the proximity of the inner end of the aligned slots 325 to the adjacent angled slots 345.

There is a pair of "perpendicular slots" 335, which are perpendicular to section line 3-3. The perpendicular slots 335 also are perpendicular to the plane of the frame arms 340. The perpendicular slots 335 have a radial length of about 0.46 inches (which is about 58% of the deflector radius) and a width of about 0.06 inches. In alternative embodiments, the length of the perpendicular slots 335 may be between about 0.3 and about 0.7 inches, preferably about 0.4 to about 0.5 inches. The width of the perpendicular slots may be about 0.06 inches, which in alternative embodiments may vary about 20%, preferably, about ±15%.

There are four "corner slots" 340 that form an angle of about 50° with section line 3-3 each having a radial length of about 0.56 inches (about 70% of the deflector radius) and a width of about 0.70 inches. In alternative embodiments, the angle of the corner slots 340 may be between about 40° and about 60°, and the length of the corner slots 340 may be about 0.4 to about 0.7 inches, preferably, about 0.5 to about 0.6 inches. The width of the corner slots may be about 0.06 inches, which in alternative embodiments may vary about ±20%, preferably, about 15%.

There are four angled slots 345 ("the first angled slots") that are positioned on both sides of the aligned slots 325 and are oriented to form an angle of about 30° with respect to aligned slots 325. In alternative embodiments, the angle may be about 15° to about 45°, preferably, about 20° to about 40°. The radial length of the first angled slots 345 (with respect to the center of the deflector) is about 0.4 inches (about 50% of the deflector radius), and these slots 345 have a width of about 0.70 inches. The inner ends of the first angled slots 345 are positioned at a radius of about 0.4 inches. In alternative embodiments, the length of these slots 345 may be about 0.2 to about 0.6 inches, preferably, about 0.3 to about 0.5 inches. The width may vary about ±20%, preferably, about ±15%.

There are an additional four angled slots 350 ("the second angled slots") that are positioned on either side of the perpendicular slots 335 and are oriented to form an angle of about 20° with respect to perpendicular slots 335. In alternative embodiments, the angle may be between about 5° and about 35°, preferably, about 10° to about 30°. The radial length of the second angled slots 350 (with respect to the center of the deflector) is about 0.2 inches (about 25% of the deflector radius), and these slots 350 have a width of about 0.09 inches. The inner ends of the second angled slots 350 are positioned at a radius of about 0.6 inches. In alternative embodiments, the length of these slots 350 may be about 0.2 to about 0.4 inches, preferably, about 0.2 to about 0.25 inches. The width may vary about ±20%, preferably, about ±15%.

The slots discussed above have rounded inner ends with a radius equal to about half of the slot width, but other geometries may also be used for the inner ends. Of course, the deflector may have other slots in addition to those described above.

In accordance with Technical Bulletin TB222, EPEC sprinklers must be tested through measurements of actual delivered density and through commodity fire tests, in which an array of sprinklers is tested in operation over predetermined configurations of commodities. The water flow from the sprinklers must be controlled by the deflector to achieve an output pattern that meets the required actual delivered density specified for the sprinkler. Representative sample sprinklers are installed at a specified spacing for each fire test, which is either 4.0 m or 4.2 m for K-8.0 (metric K-factor 115). The required density is either 6.0 mm/min (for Ordinary Hazard Group III/10) or 6.5 mm/min (for Ordinary Hazard Group 111/12.5) over a design area of 160 m$^2$, which corresponds to an array of ten sprinklers, each covering 16 m$^2$.

In order to maintain the proper density of water output over the specified area, the sprinkler must have a spray pattern that is approximately square. To achieve such a pattern, the corner slots are designed to be somewhat longer than the aligned slots and the perpendicular slots, in order to project more water toward the corners of the spray pattern. Likewise, the first and second sets of angled slots are angled toward the corner of the output pattern, which further tends to create a square pattern. In addition, directing the output spray toward the corner of the spray pattern lessens the amount of water output toward adjacent sprinklers. This helps to prevent "cold soldering," which is a condition in which water is output by a sprinkler directly onto an adjacent sprinkler, thereby lowering the temperature of the adjacent sprinkler and preventing it from properly activating.

For more than one hundred years, sprinklers have been manufactured with threads for connection to pipe, as noted above. Sprinklers with threads are typically connected to pipe using a welded, threaded outlet or a mechanically-connected threaded outlet. A welded threaded outlet is typically connected to pipe by creating a hole in the pipe, and then welding the welded, threaded outlet around the hole. A mechanically-connected threaded outlet is typically connected to pipe by cutting a hole in the pipe, and then mechanically attaching the mechanically-connected threaded outlet to the pipe around the hole, often using a clamp around the circumference of the pipe.

The sprinkler threads are connected to the outlet using a threaded sealant, often polytetrafluoroethylene (PTFE) tape, applied to the sprinkler threads, then tightening the sprinkler into the outlet using a wrench. Sprinklers typically have threads of ½", ¾", or 1" nominal size, although sprinklers with 1¼" nominal treads are available. As the thread size increases, the amount of torque needed to install the sprinkler, while limiting leaks, also increases, and makes the installation more time and labor intensive. Thus, a less time and labor intensive method of connecting sprinklers to pipe is desirable.

Sprinklers are also manufactured with an external groove for connection to an outlet with a groove in the outer perimeter using a grooved coupling. The grooved coupling typically comprises two housings that are connected together with one or more bolts or screws and a sealing gasket. When connected together, the two housings span between and connect the groove in the sprinkler with the groove in the outer perimeter of the outlet. The sealing gasket seals against both the outer circumference of the sprinkler and the outer circumference of the outlet providing a water-tight conduit between the sprinkler and the outlet.

The grooved coupling connects the sprinkler to the outlet so that the end of the sprinkler remains outside of the outlet, which makes the sprinkler extended farther away from the pipe than an otherwise identical sprinkler inserted partially into the outlet (such as with threads). Moving the sprinkler farther from the pipe requires more space for installation, creates a more difficult to support sprinkler during seismic events, and may cause the sprinkler to be located farther from a ceiling, delaying activation. This is disadvantageous.

Generally speaking, so called quick connector assemblies are also known in the art. For example, U.S. Pat. No. 9,851,035 discusses such a quick connector assembly that includes a housing with an open bore that extends along an axis from an open first end for receiving a cross-linked polyethylene (PEX) tube to an open second end for receiving copper or chlorinated polyvinyl chloride (CPVC) pipe. The housing presents an inner surface that defines the open bore and an outer surface. Between the first and second ends, the housing serially extends through a first end section, a first intermediate section, a second intermediate section and a second end section. The outer surface of the first end section is formed according to ASTM F-1960 standards to establish a fluid connection with the PEX tube through a standard expansion connection with a PEX expansion ring. However, it should be appreciated that the first end section could be configured for attachment with the PEX tube through any suitable style of connection including, for example, shark bite connections, compression connections, crimping connections, clamping connections or pressing connections. The housing is preferably made as one integral piece of a polymeric material and is preferably formed through an injection molding process. The housing also may be made of any suitable materials and through any suitable forming processes.

Another so called quick connect fitting is discussed in U.S. Pat. No. 9,650,768. The quick-connect fitting includes a housing attached to a quick-connect portion of a molded base. A retention ring attached to an adapter is held in place in the quick-connect fitting by a housing and a retention clip. The quick-connect fitting also includes a first O-ring, a back-up ring, and a second O-ring to seal the connection. Another illustrative quick-connect fitting is available from BrassCraft Mfg. Co, Novi Mich. Parts of the quick connect fitting vary depending on the connector system for use therewith. Exemplary connector systems may include, but are not limited to, SureConnect and NGS (available from BrassCraft Mfg Co, Novi, Mich.), Push-to-Lock (available from Rayconnect Inc, Rochester Hills, Mich.), the Shark Bite Connection System (available from Reliance Worldwide Corporation, Birmingham, Ala.) or JG Speedfit (available from John Guest USA Inc, Fairfield, N.J.).

Such quick connector assemblies and quick connect fittings have drawbacks, however, in that they are typically "one and done." In other words, once connected, they may not be easily unconnected. If unconnected, the connections are damaged. This is undesirable.

Accordingly, a need has arisen to provide a fire protection sprinkler with a push-in connection that overcomes the drawbacks associated with conventional devices, as noted above, while yet still providing for the requisite spray patterns and/or outputs needed in the industry for fire suppression.

SUMMARY OF THE INVENTION

Our invention is a fire protection sprinkler with a push-in connection. The sprinkler comprises a sprinkler frame, an operating element, and a sealing cap. The sprinkler also comprises one or more sealing gaskets and a retainer. Each such sealing gasket is located at least partially within a groove in the sprinkler frame. The retainer is also at least partially located within a groove in the sprinkler frame. The retainer connects to the internal bore of a welded outlet or a mechanical outlet when the sprinkler is installed in the outlet. The one or more gaskets seal against the internal bore of a welded outlet or a mechanical outlet when the sprinkler is installed in the outlet. The retainer can be a spring mechanism so that the diameter of the retainer is reduced when the sprinkler is inserted into the internal bore of the outlet, and the retainer maintains pressure against the internal bore of the outlet when the sprinkler is installed in the outlet. To provide a positive connection between the retainer and the outlet, the outlet may have a circumferential groove in its inner bore so that the retainer is located at least partially within both the groove in the sprinkler frame and the groove in the outlet when the sprinkler is installed to the outlet. The sprinkler may be removed from the outlet by compressing the retainer so that the retainer is less than the diameter of the internal bore of the outlet allowing the sprinkler to be pulled from the outlet.

These and other features of our invention will be described with reference to the drawings, described below.

DESCRIPTION OF THE EMBODIMENTS

Our invention is a sprinkler with a push-in connection. The sprinkler comprises a sprinkler frame, an operating element, and a sealing cap. The sprinkler also comprises one or more sealing gaskets and a retainer. Each such sealing gasket is located at least partially within a groove in the sprinkler frame. The retainer is also at least partially located within a groove in the sprinkler frame. The retainer connects to the internal bore of a welded outlet or a mechanical outlet when the sprinkler is installed in the outlet. The one or more gaskets seal against the internal bore of a welded outlet or a mechanical outlet when the sprinkler is installed in the outlet. The retainer can be a spring mechanism so that the diameter of the retainer is reduced when the sprinkler is inserted into the internal bore of the outlet, and the retainer maintains pressure against the internal bore of the outlet when the sprinkler is installed in the outlet. To provide a positive connection between the retainer and the outlet, the outlet may have a circumferential groove in its inner bore so that the retainer is located at least partially within both the groove in the sprinkler frame and the groove in the outlet when the sprinkler is installed to the outlet. The sprinkler may be removed from the outlet by compressing the retainer so that the retainer is less than the diameter of the internal bore of the outlet allowing the sprinkler to be pulled from the outlet.

Currently, a sprinkler with a hexagonal retainer and a pressure sealed gasket with two sealing fins is the most promising embodiment. The pressure sealed gasket comprises one or more fins, where one side of each fin touches the inner bore of the outlet when the sprinkler is installed and the other side of each fin is exposed to the water or air within the outlet. When the water or air within the pipe and outlet is pressurized, the water or air presses the fin against the inner bore of the outlet improving the seal. Multiple fins are provided to improve reliability if imperfections in the inner bore of the outlet, debris, or other reasons prevent a fin from maintaining a leak-tight seal.

Figure 1:
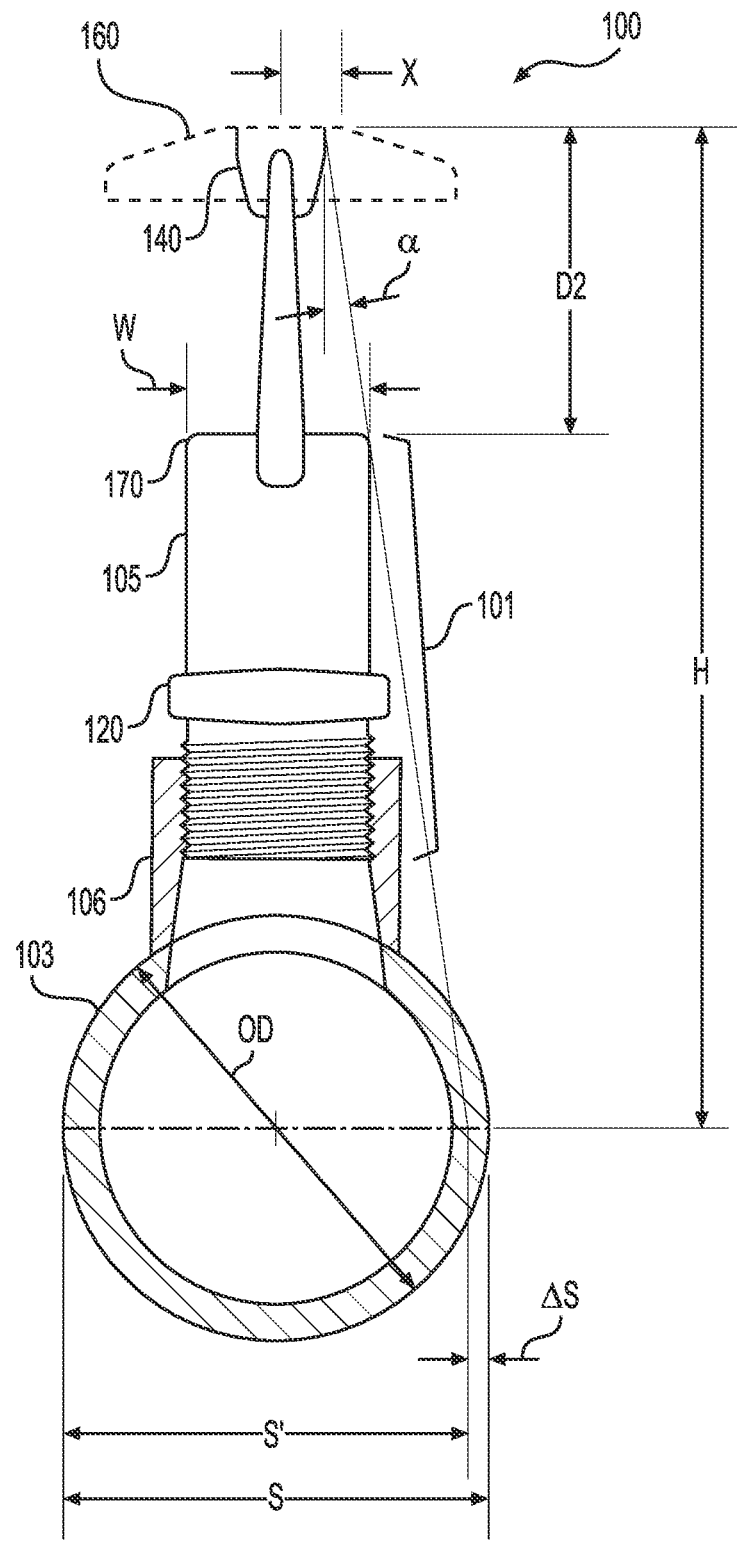
FIG. 1 is a side view of a conventional upright fire protection sprinkler mounted on a supply conduit.
Figure 2:
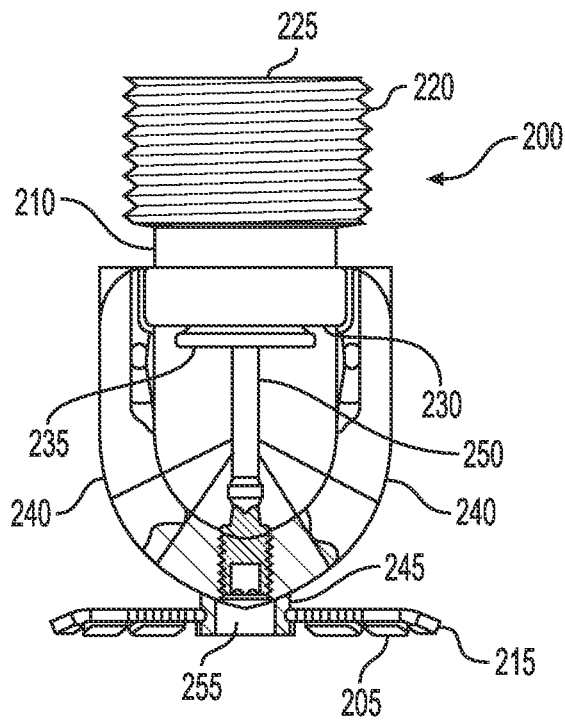
FIG. 2 is an elevational view of a conventional enhanced protection extended coverage pendent sprinkler.
Figure 3:
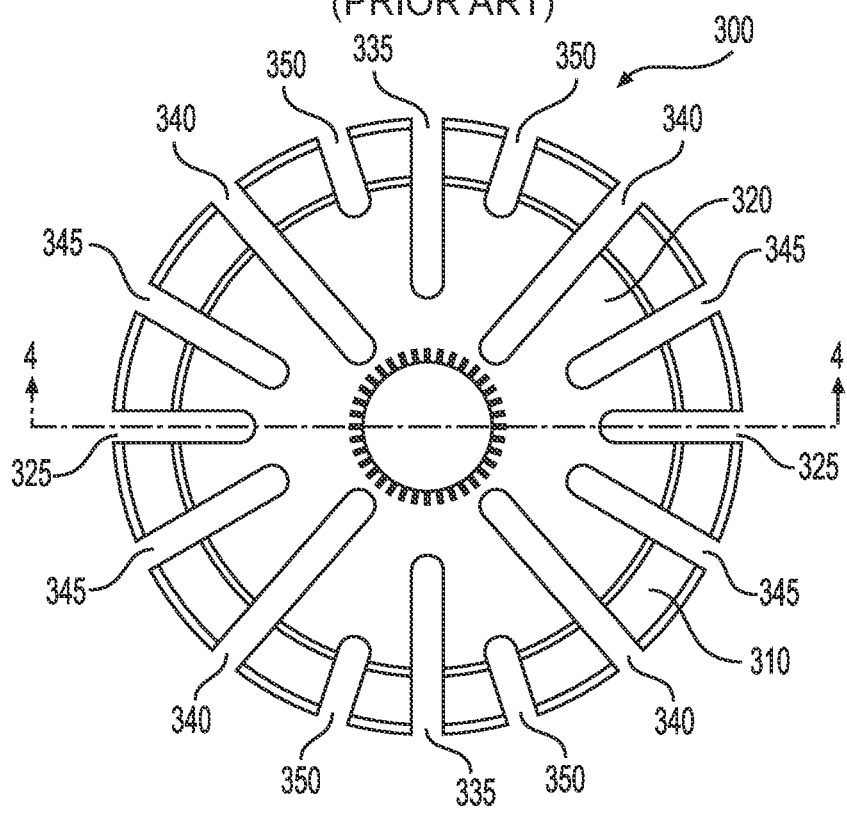
FIG. 3 is a plan view of a deflector showing a surface facing away from an outlet orifice in the sprinkler shown in FIG. 2.
Figure 4:
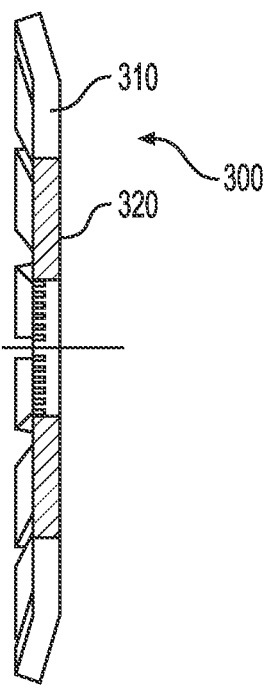
FIG. 4 is a sectional view of the deflector in the plane of the frame arms.
Figure 5:
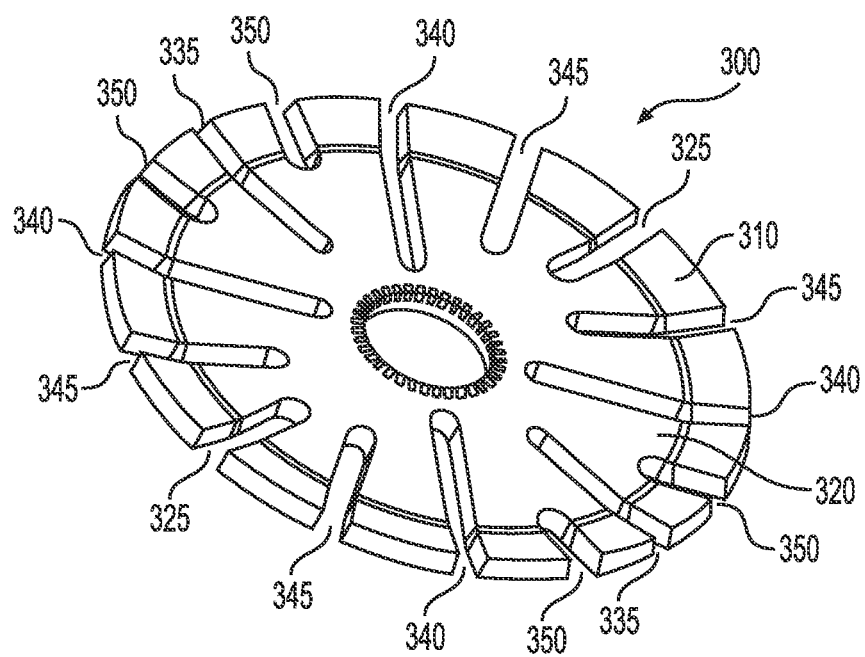
FIG. 5 is a perspective view of the deflector showing the surface facing away from the outlet orifice.
Figure 6:
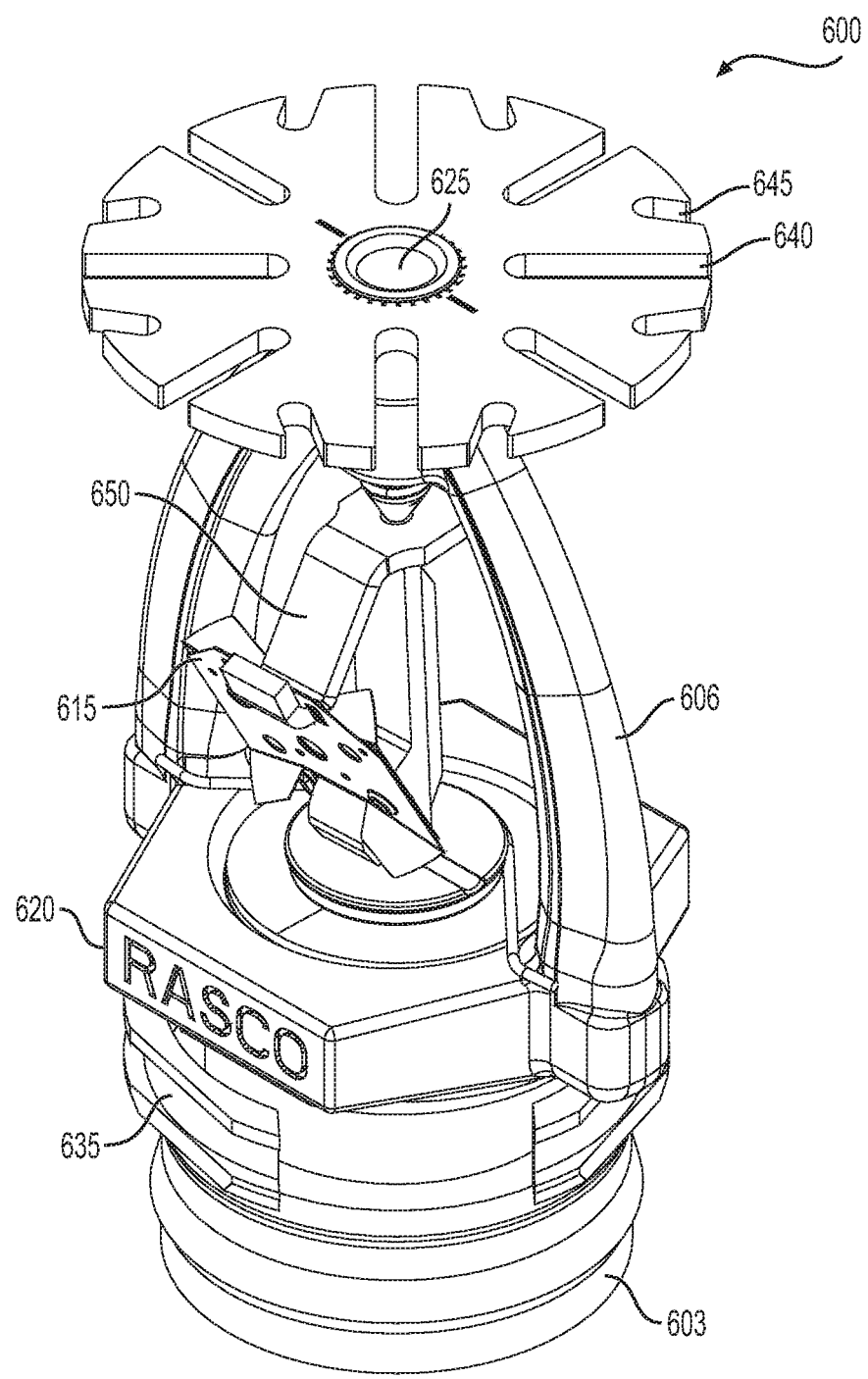
FIG. 6 is a perspective view showing a fire protection sprinkler with a push-in connection of our invention.

FIG. 6 is a perspective view showing a fire protection sprinkler with a push-in connection of our invention. FIG. 6 includes reference numbers 600, showing a fire protection sprinkler with a push-in connection, 603, showing a push-in connector of our invention, 606, showing a frame arm, 615, showing a thermally responsive frangible mechanism, 620, showing a support base, 625, showing an output orifice, 635, showing a spring mechanism, 640, showing a corner slot of deflector, 645, showing an angled slot of the deflector, and 650, showing a support frame.

Figure 7:
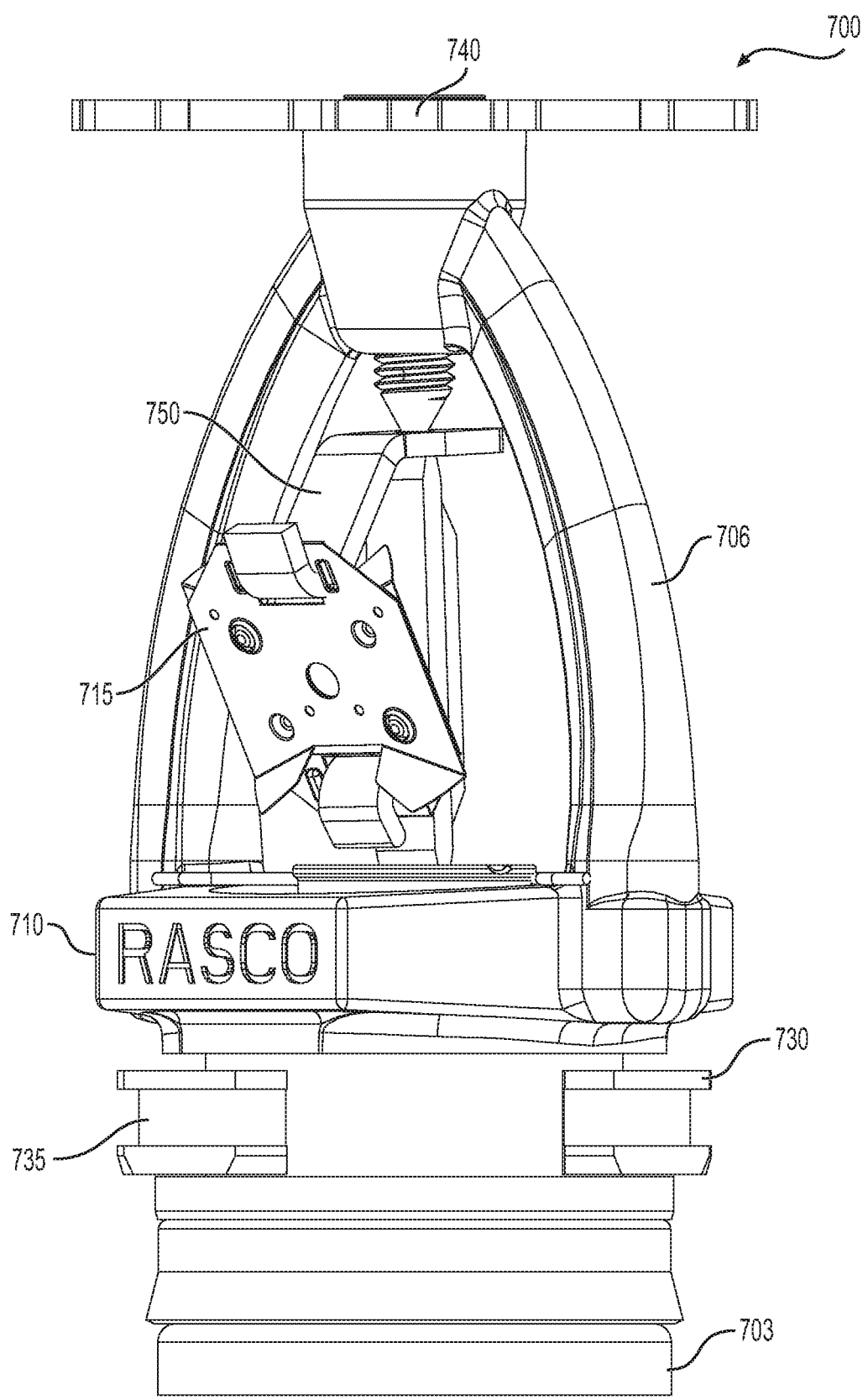
FIG. 7 is an elevation view showing the fire protection sprinkler with a push-in connection of our invention.

FIG. 7 is an elevation view showing the fire protection sprinkler with a push-in connection of our invention. FIG. 7 includes reference numbers 700, showing a fire protection sprinkler with a push-in connection, 703, showing a push-in connector of our invention, 706, showing a frame arm, 710, showing a support base, 715, showing a thermally responsive frangible mechanism, 730, showing an outer edge of a recess, 735, showing a spring mechanism located within the recess, 740, showing a deflector, and 750, showing a support frame.

Figure 8:
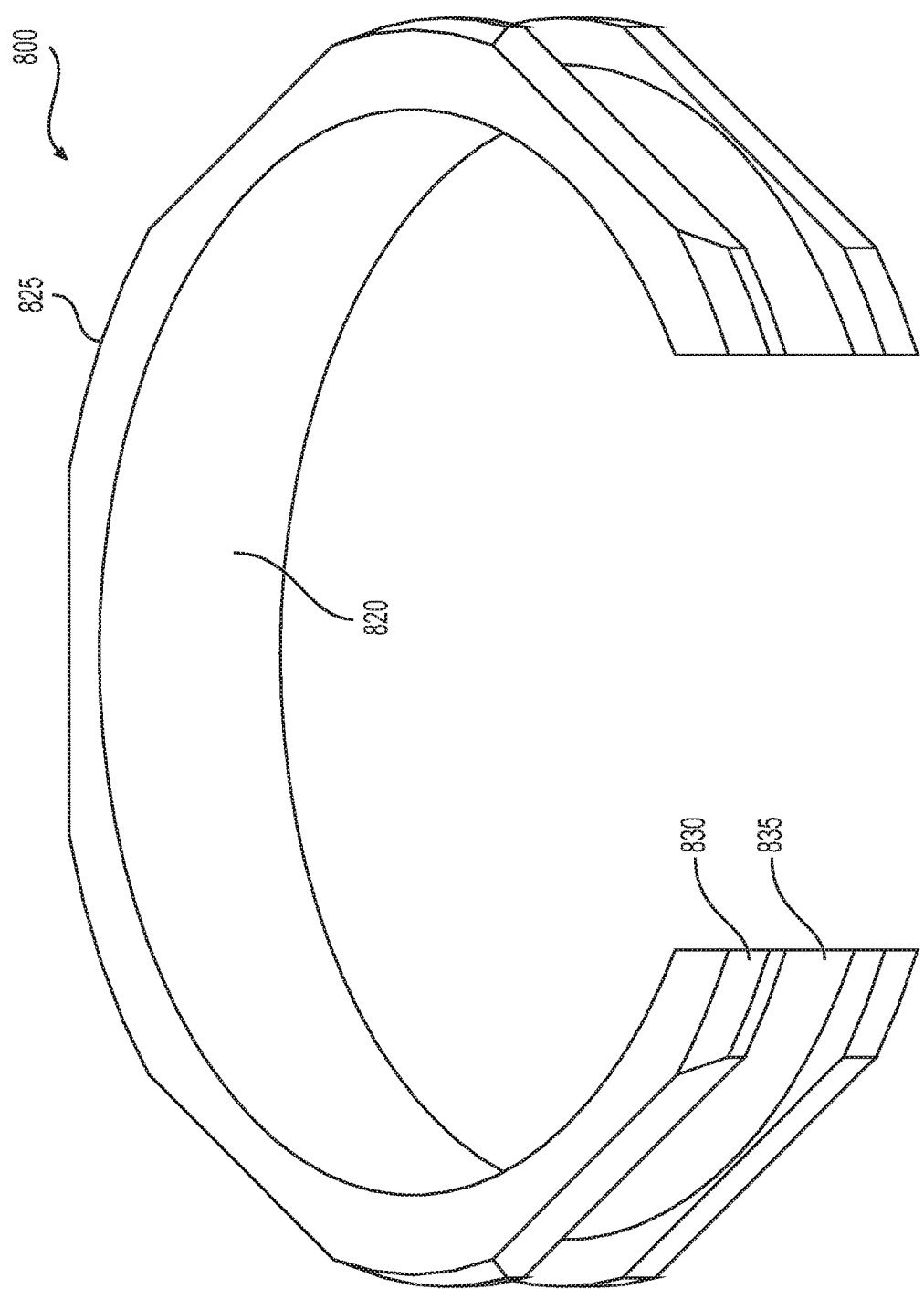
FIG. 8 shows a hexagonal retainer that may be used with a fire protection sprinkler with a push-in connection of our invention.

FIG. 8 shows a hexagonal retainer that may be used with a fire protection sprinkler with a push-in connection of our invention. FIG. 8 includes reference numbers 800, showing a hexagonal retainer spring mechanism, 820, showing an inner parameter surface, 825, showing an outer parameter surface, 830, showing a flange portion, and 835, a recessed portion.

Figure 9:
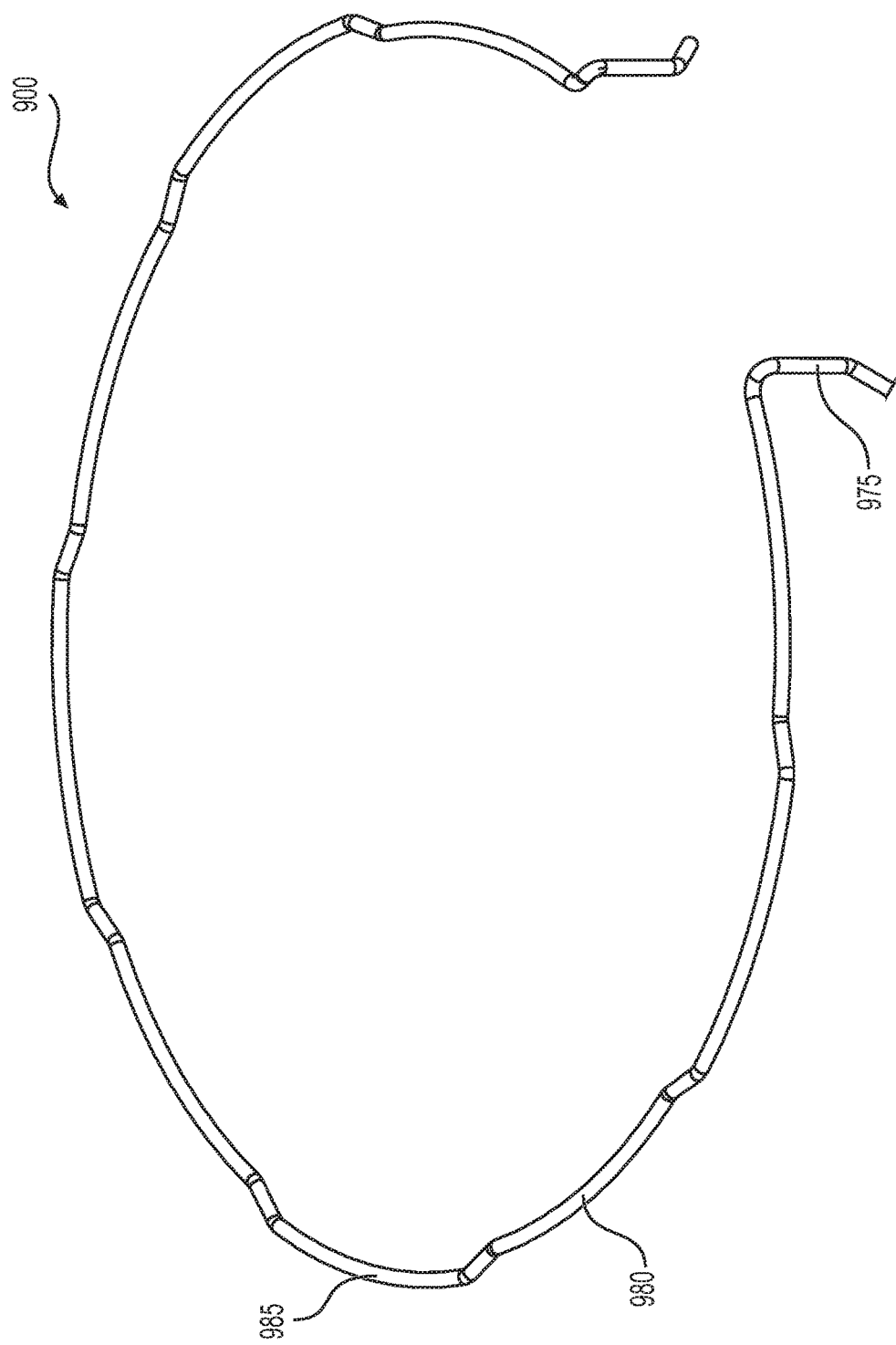
FIG. 9 shows a multi-lobe wire retainer that may be used with a fire protection sprinkler with a push-in connection of our invention.

FIG. 9 shows a multi-lobe wire retainer that may be used with a fire protection sprinkler with a push-in connection of our invention. FIG. 9 includes reference numbers 900, showing a multi-lobe wire retainer spring mechanism, 975, showing a depending leg, 980, showing one arcuate segment, and 985, showing an adjoining arcuate segment.

The five most common spring wire material options:
Stainless Steel—Cold drawn general purpose wire. Features include corrosion and heat resistance.
Music Wire—Highest quality cold drawn, high carbon wire. High strength and features a good surface finish.
Hard Drawn MB—Cold drawn wire for average stress applications. Medium strength and low cost.
Oil Tempered—Wire is cold drawn and heat treated before fabrication. Good general purpose spring wire for torsion springs.
Brass—Generally not used as commonly due to cost. Tends to tarnish and change color over time. Features good corrosion and water resistance.

Figure 10:
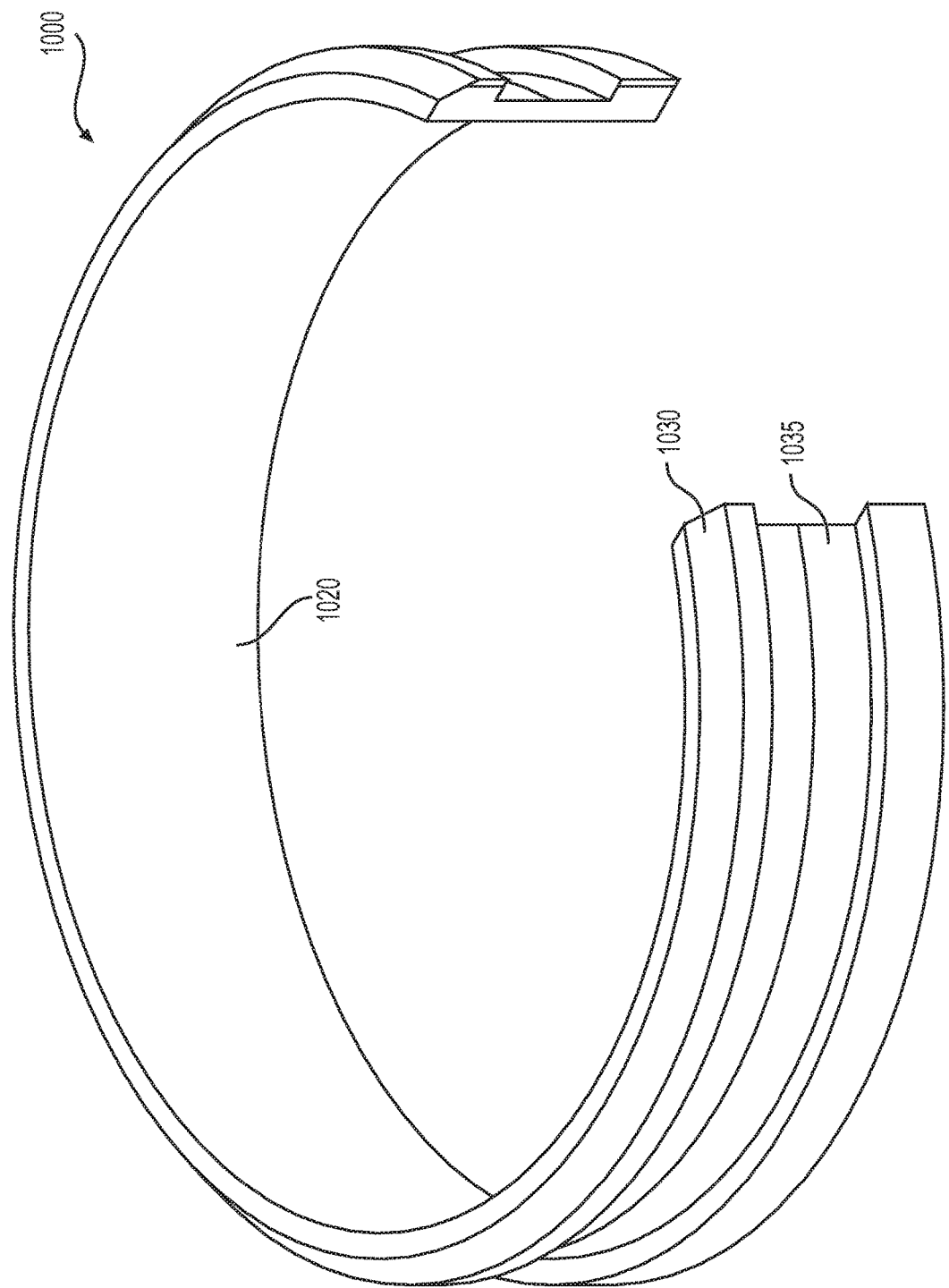
FIG. 10 shows an oval retainer that may be used with a fire protection sprinkler with a push-in connection of our invention.

FIG. 10 shows an oval retainer that may be used with a fire protection sprinkler with a push-in connection of our invention. FIG. 10 includes reference numbers 1000, showing an oval retainer that may be used with a fire protection sprinkler with a push-in connection of our invention, 1020, showing an inner peripheral surface, 1030, showing an upper edge of the flange portion, and 1035, showing a recessed groove.

Figure 11:
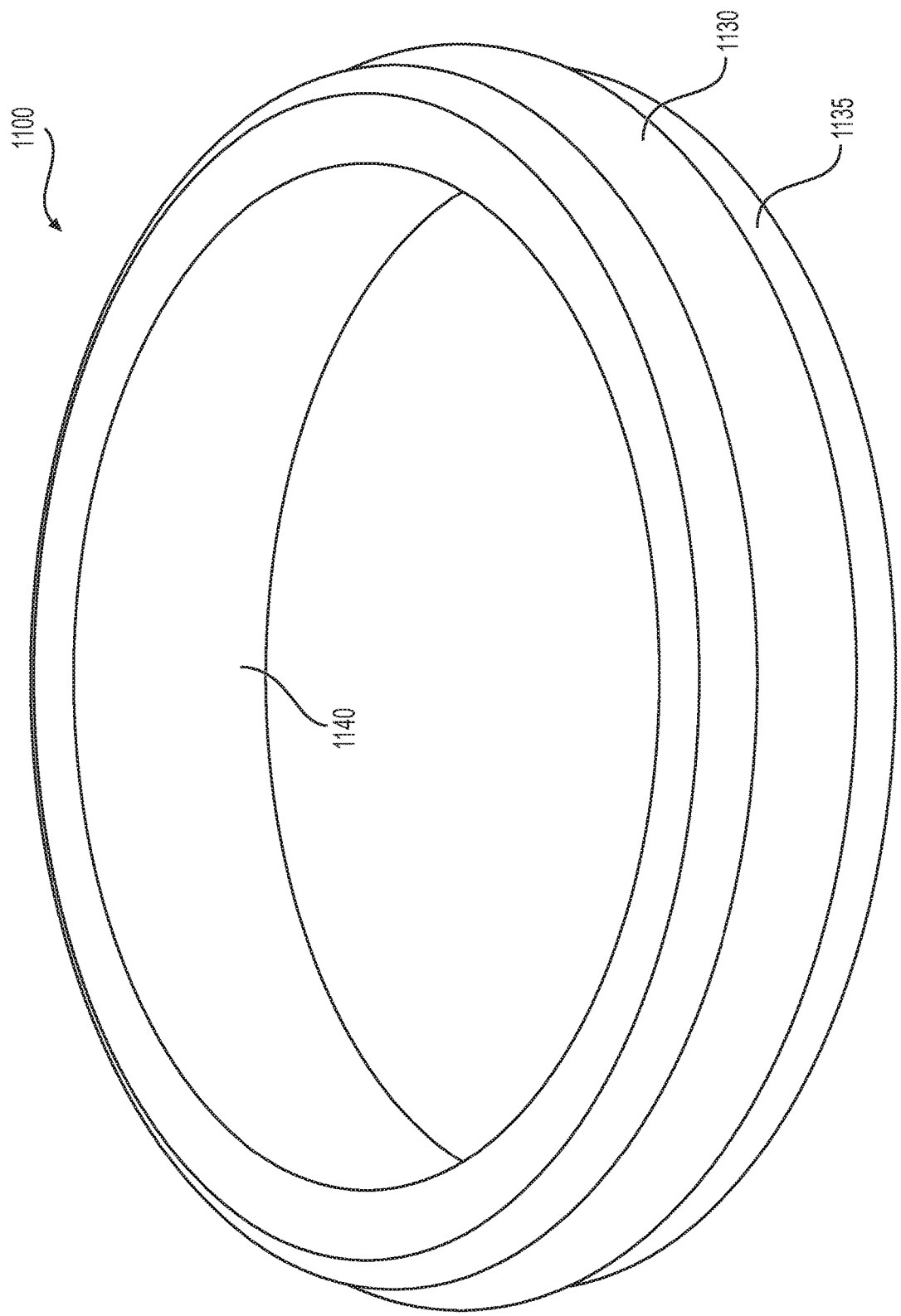
FIG. 11 shows a pressure sealed gasket with one or more sealing fins that may be used with a fire protection sprinkler with a push-in connection of our invention.

FIG. 11 shows a pressure sealed gasket with one or more sealing fins that may be used with a fire protection sprinkler with a push-in connection of the invention. FIG. 10 includes reference numbers 1100, showing a pressure sealed gasket with one or more sealing fins that may be used with a fire protection sprinkler with a push-in connection of our invention, 1130, showing a sealing fin, 1135, showing a recess, and 1140, showing an inner peripheral surface.

Figure 12:
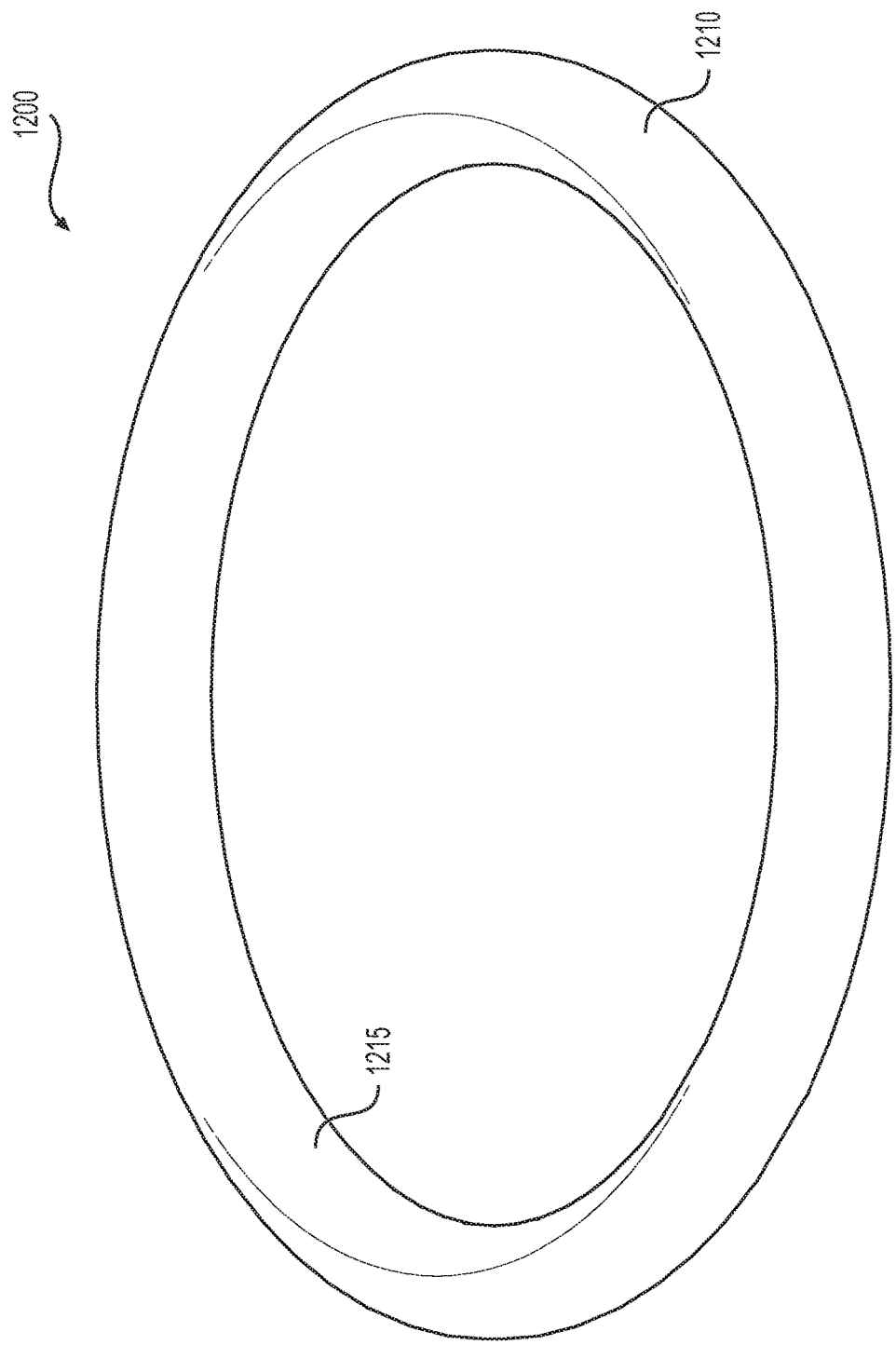
FIG. 12 shows an exemplary O-ring that may be used with a fire protection sprinkler with a push-in connection of our invention.

FIG. 12 shows an O-ring that may be used with a fire protection sprinkler with a push-in connection of our invention. FIG. 12 includes reference numbers 1200, showing an O-ring that may be used with a fire protection sprinkler with a push-in connection of our invention, 1210, showing an outer peripheral edge, and 1215, showing an inner peripheral edge.

Generally speaking, an O-ring, also known as a packing or a toric joint, is a mechanical gasket in the shape of a torus. It is a loop of elastomer with a round cross section, designed to be seated in a groove and compressed during assembly between two or more parts, creating a seal at the interface.

The O-ring may be used in static applications or in dynamic applications where there is relative motion between the parts and the O-ring. Static applications of O-rings may include fluid or gas sealing applications in which: (1) the O-ring is compressed resulting in zero clearance, (2) the O-ring material is a vulcanized solid such that it is impermeable to the fluid or gas, and (3) the O-ring material is resistant to degradation by the fluid or gas.

O-rings are one of the most common seals used in machine design because they are inexpensive, easy to make, reliable, and have simple mounting requirements. They have been tested to seal up to 5000 psi (35 megapascals) of pressure. The maximum recommended pressure of an O-ring seal depends on the seal hardness and gland clearance.

O-rings are available in various metric and inch standard sizes. Sizes are specified by the inside diameter and the cross section diameter (thickness). In the U.S., the most common standard inch sizes are per SAE AS568C specification (e.g., AS568-214). ISO 3601-1:2012 contains the most commonly used standard sizes, both inch and metric, worldwide. The UK also has standards sizes known as British Standard (BS) sizes, typically ranging from BS001 to BS932. Several other size specifications also exist.

Successful O-ring joint design requires a rigid mechanical mounting that applies a predictable deformation to the O-ring. This introduces a calculated mechanical stress at the O-ring contacting surfaces. As long as the pressure of the fluid being contained does not exceed the contact stress of the O-ring, leaking cannot occur. The pressure of the contained fluid transfers through the essentially incompressible O-ring material, and the contact stress rises with increasing pressure. For this reason, an O-ring can easily seal high pressure as long as it does not fail mechanically. The most common failure is extrusion through the mating parts.

The seal is designed to have a point contact between the O-ring and sealing faces. This allows a high local stress, able to contain high pressure, without exceeding the yield stress of the O-ring body. The flexible nature of O-ring materials accommodates imperfections in the mounting parts. But it is still important to maintain good surface finish of those mating parts, especially at low temperatures where the seal rubber reaches its glass transition temperature and becomes increasingly crystalline. Surface finish is also especially important in dynamic applications. A surface finish that is too rough will abrade the surface of the O-ring, and a surface that is too smooth will not allow the seal to be adequately lubricated by a fluid film.

O-ring selection is based on chemical compatibility, application temperature, sealing pressure, lubrication requirements, durometer, size, and cost.

Figure 13:
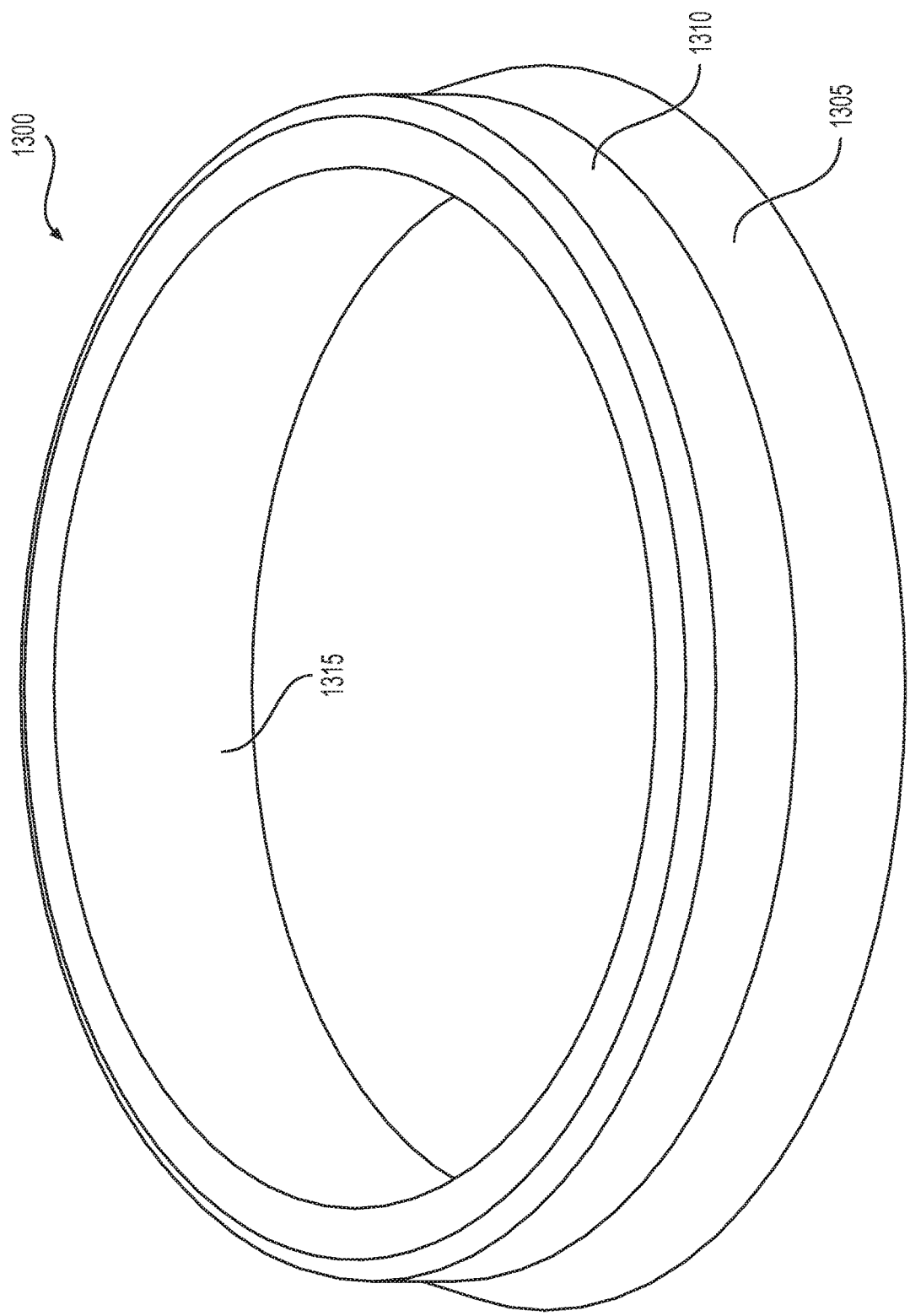
FIG. 13 shows an exemplary gasket with one or more lobes that may be used with a fire protection sprinkler with a push-in connection of our invention.

O-rings are typically made from the following materials:
(A) Synthetic Rubbers or Thermosets
Butadiene rubber (BR)
Butyl rubber (IIR)
Chlorosulfonated polyethylene (CSM)
Epichlorohydrin rubber (ECH, ECO)
Ethylene propylene diene monomer (EPDM): good resistance to hot water and steam, detergents, caustic potash solutions, sodium hydroxide solutions, silicone oils and greases, many polar solvents and many diluted acids and chemicals. Special formulations are excellent for use with glycol-based brake fluids. Unsuitable for use with mineral oil products: lubricants, oils, or fuels. Peroxide-cured compounds are suitable for higher temperatures.
Ethylene propylene rubber (EPR)
Fluoroelastomer (FKM): noted for their very high resistance to heat and a wide variety of chemicals. Other key benefits include excellent resistance to aging and ozone, very low gas permeability and the fact that the materials are self-extinguishing. Standard FKM materials have excellent resistance to mineral oils and greases, aliphatic, aromatic and chlorinated hydrocarbons, fuels, non-flammable hydraulic fluids (HFD) and many organic solvents and chemicals. Generally not resistant to hot water, steam, polar solvents, glycol-based brake fluids and low molecular weight organic acids. In addition to the standard FKM materials, a number of specialty materials with different monomer compositions and fluorine content (65% to 71%) are available that offer improved chemical or temperature resistance and/or better low temperature performance.
Nitrile rubber (NBR, HNBR, HSN, Buna-N): a common material for O-rings because of its good mechanical properties, its resistance to lubricants and greases, and its relatively low cost. The physical and chemical resistance properties of NBR materials are determined by the acrylonitrile (ACN) content of the base polymer: low content ensures good flexibility at low temperatures, but offers limited resistance to oils and fuels. As the ACN content increases, the low temperature flexibility reduces and the resistance to oils and fuels improves. Physical and chemical resistance properties of NBR materials are also affected by the cure system of the polymer. Peroxide-cured materials have improved physical properties, chemical resistance and thermal properties, as compared to sulfur-donor-cured materials. Standard grades of NBR are typically resistant to mineral oil-based lubricants and greases, many grades of hydraulic fluids, aliphatic hydrocarbons, silicone oils and greases and water to about 80° C. NBR is generally not resistant to aromatic and chlorinated hydrocarbons, fuels with a high aromatic content, polar solvents, glycol-based brake fluids and non-flammable hydraulic fluids (HFD). NBR also has low resistance to ozone, weathering and aging. HNBR has considerable improvement of the resistance to heat, ozone and aging, and gives it good mechanical properties.
Perfluoroelastomer (FFKM)
Polyacrylate rubber (ACM)
Polychloroprene (neoprene) (CR)
Polyisoprene (IR)
Polysulfide rubber (PSR)
Polytetrafluoroethylene (PTFE)
Sanifluor (FEPM)
Silicone rubber (SiR): noted for their ability to be used over a wide temperature range and for excellent resistance to ozone, weathering and aging. Compared with most other sealing elastomers, the physical properties of silicones are poor. Generally, silicone materials are physiologically harmless so they are commonly used by the food and drug industries. Standard silicones are resistant to water (to 100° C.), aliphatic engine and transmission oils and animal and plant oils and fats. Silicones are generally not resistant to fuels, aromatic mineral oils, steam (short term to 120° C. is possible), silicone oils and greases, acids or alkalis. Fluorosilicone elastomers are far more resistant to oils and fuels. The temperature range of applications is somewhat more restricted.
Styrene-butadiene rubber (SBR); and
(B) Thermoplastics:
Thermoplastic elastomer (TPE) styrenics
Thermoplastic polyolefin (TPO) LDPE, HDPE, LLDPE, ULDPE
Thermoplastic polyurethane (TPU) polyether, polyester: Polyurethanes differ from classic elastomers in that they have much better mechanical properties. In particular they have a high resistance to abrasion, wear and extrusion, a high tensile strength and excellent tear resistance. Polyurethanes are generally resistant to aging and ozone, mineral oils and greases, silicone oils and greases, nonflammable hydraulic fluids HFA & HFB, water up to 50° C. and aliphatic hydrocarbons.
Thermoplastic etheresterelastomers (TEEEs) copolyesters
Thermoplastic polyamide (PEBA) Polyamides
Melt Processible Rubber (MPR)
Thermoplastic Vulcanizate (TPV)
(C) Chemical Compatibility
Air, 200-300° F.—Silicone
Water—EPDM FIG. 13 shows an exemplary gasket with one or more lobes that may be used with a fire protection sprinkler with a push-in connection of our invention. FIG. 13 includes reference numbers 1300, showing an exemplary gasket that may be used with a fire protection sprinkler with a push-in connection of our invention, 1305, shows a sealing lobe, 1310, shows a recess, and 1315 shows an inner peripheral surface.

Figure 14:
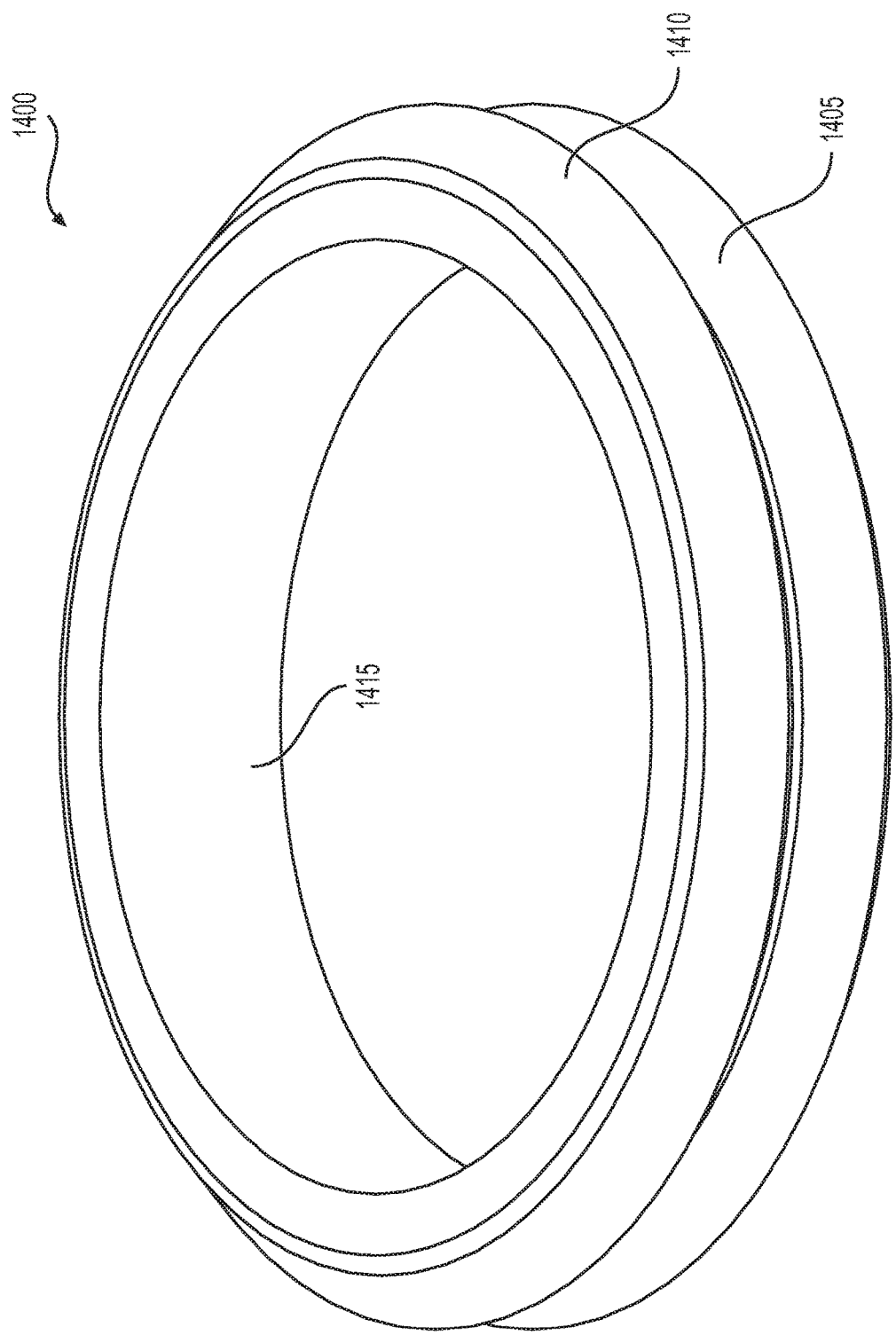
FIG. 14 shows another exemplary gasket with one or more lobes that may be used with a fire protection sprinkler with a push-in connection of our invention.

FIG. 14 shows another exemplary gasket with one or more lobes that may be used with a fire protection sprinkler with a push-in connection of our invention. FIG. 14 includes reference numbers 1400, showing an exemplary gasket that may be used with a fire protection sprinkler with a push-in connection of our invention, 1405, showing a recess, 1410, showing a sealing lobe, and 1415, showing an inner peripheral surface.

Figure 15:
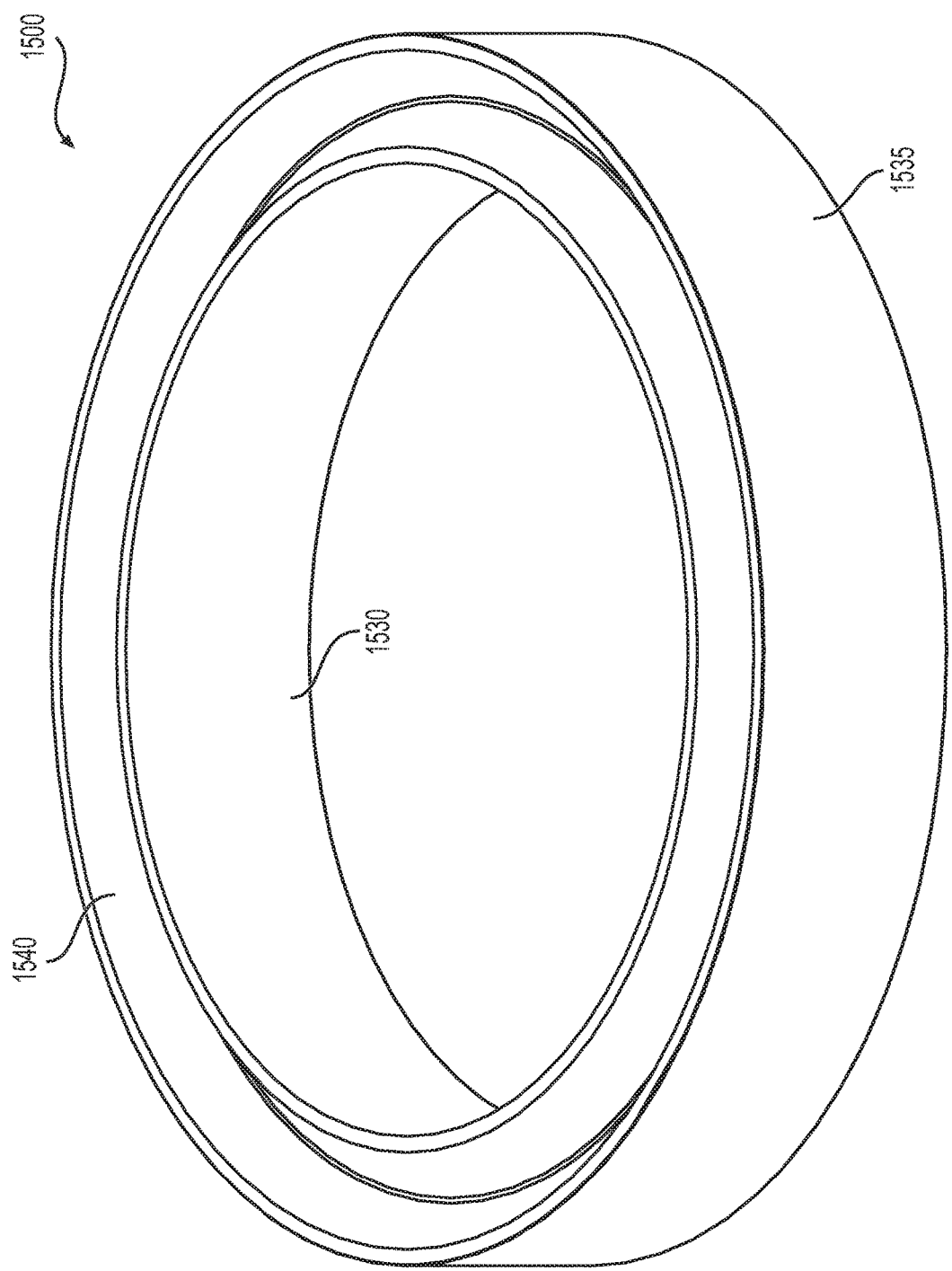
FIG. 15 shows a notched gasket that may be used with a fire protection sprinkler with a push-in connection of our invention.

FIG. 15 shows a notched gasket that may be used with a fire protection sprinkler with a push-in connection of our invention. FIG. 15 includes reference numbers 1500 showing a notched gasket that may be used with a fire protection sprinkler with a push-in connection of our invention, 1530, showing an inner peripheral surface, 1535, showing an outer peripheral surface, and 1540, showing a notch.

Figure 16:
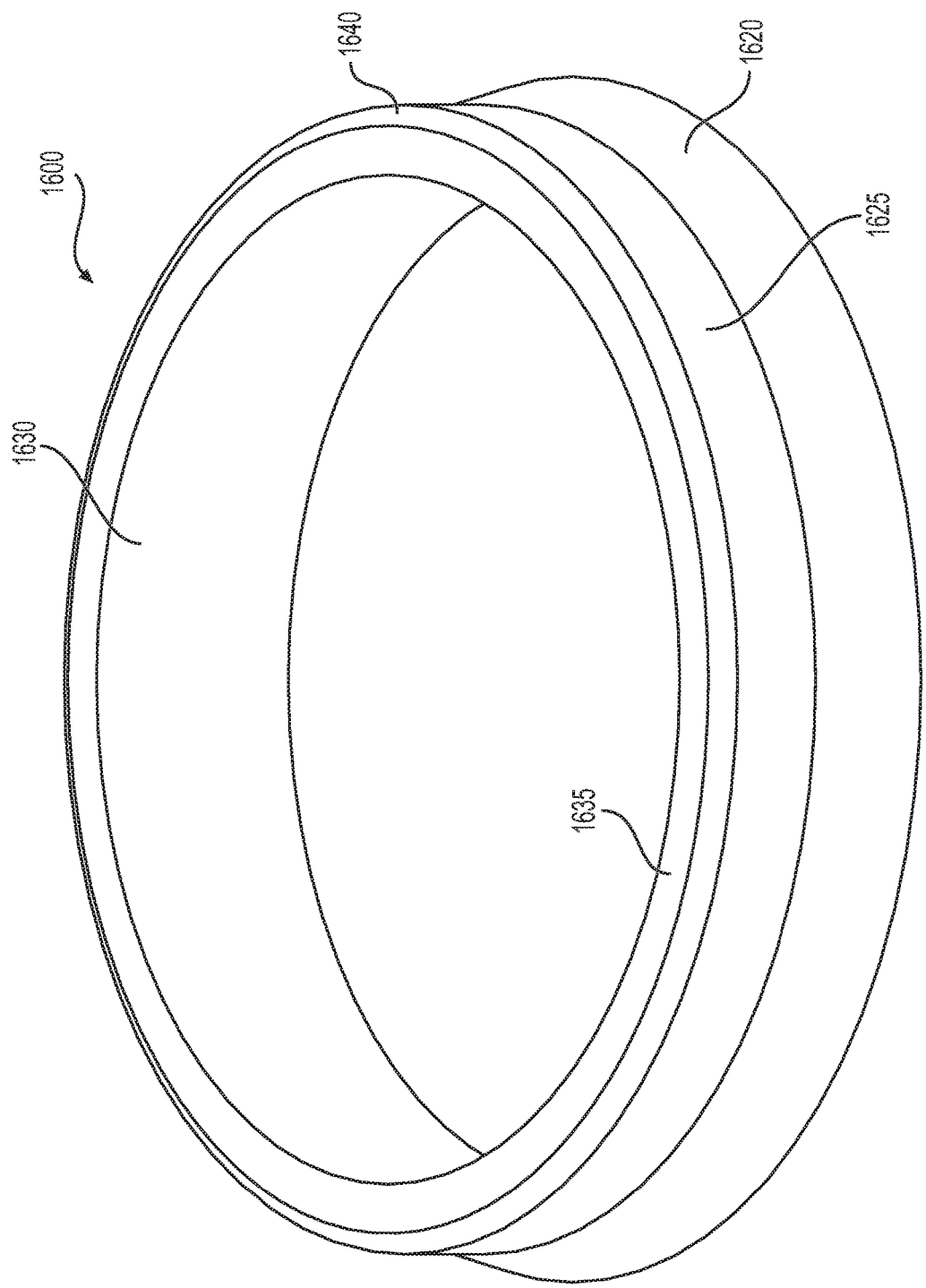
FIG. 16 shows yet another example of a gasket that may be used with a fire protection sprinkler with a push-in connection of our invention.

FIG. 16 shows yet another example of a gasket that may be used with a fire protection sprinkler with a push-in connection of our invention. FIG. 16 includes reference numbers 1600, showing an example of a gasket that may be used with a fire protection sprinkler with a push-in connection of our invention, 1620, showing a lower lobe, 1625, showing a recess, 1630, showing an inner peripheral surface, 1635, showing an upper edge, and 1640, showing an upper lobe.

With the exception, of course, of the multi-lobe wire retainer shown in FIG. 9, the materials set forth above for the O-ring shown in FIG. 12 may also be used for the retainers and gaskets shown in FIGS. 8, 10, 11, and 13 to 16, as desired.

Figure 17A:
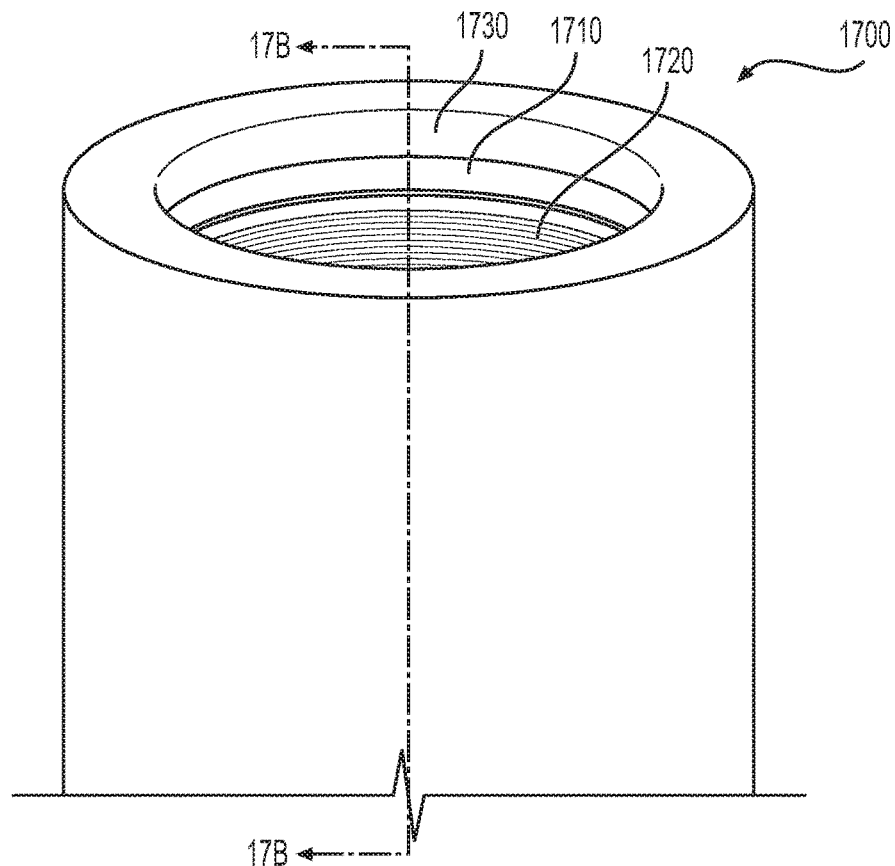
FIG. 17A shows an example of an outlet that may have a circumferential groove in its inner bore.

FIG. 17A shows an example of an outlet that may have a circumferential groove in its inner bore. FIG. 17A includes reference numbers 1700, showing an outlet that may be used with a fire protection sprinkler with a push-in connection of our invention, 1710, showing an upper recess, 1720, showing a lower recess, and 1730, showing an inner peripheral surface.

Figure 17B:
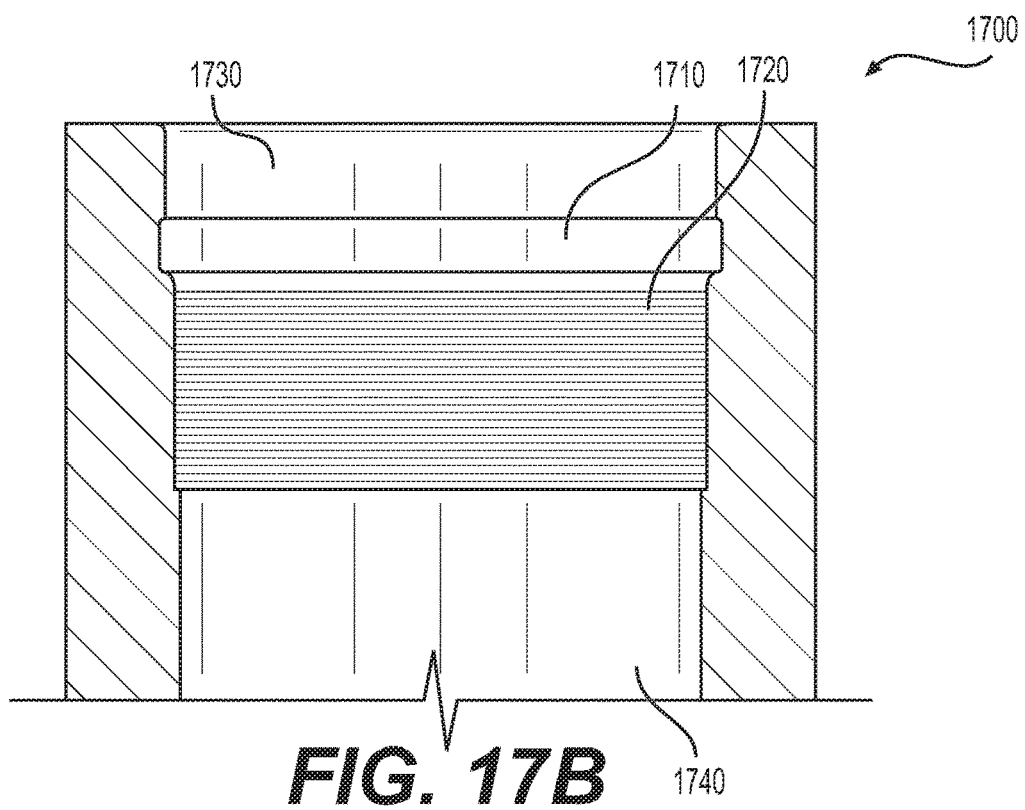
FIG. 17B shows a cross-sectional view of the outlet shown in FIG. 17A taken along cross-sectional line 17A-17A to show more clearly the circumferential groove.

FIG. 17B shows a cross-sectional view of the outlet shown in FIG. 17A taken along cross-sectional line 17A-17A to show more clearly the circumferential groove. FIG. 17B includes reference numbers 1700, showing the outlet that may be used with a fire protection sprinkler with a push-in connection of our invention, 1710, showing the upper recess, 1720, showing the lower recess, 1730, showing the inner peripheral surface, and 1740, showing an inlet.

While the present invention has been described with respect to what are, at present, considered to be the preferred embodiments, it is to be understood that the invention is not limited to the disclosed embodiments. To the contrary, the invention is intended to cover various modifications and equivalent arrangements included within the spirit and scope of the appended claims.

We claim:

1. A fire protection sprinkler having a push-in connection for being connected to a fluid supply conduit, the fluid supply conduit having a welded outlet or a mechanical outlet, the welded outlet or the mechanical outlet having an internal bore with an internal circumferential groove, the fire protection sprinkler comprising:
    a sprinkler frame having an input end and an output end, and a plurality of grooves at the input end;
    an operating element having a frangible element designed to fail at a predetermined temperature so that fluid flows from the fluid supply conduit to the output end of the sprinkler frame;
    a sealing cap covering the operating element;
    at least one sealing gasket, each of the at least one sealing gaskets being located at least partially within a corresponding one of the plurality of grooves in the sprinkler frame; and
    a retainer also at least partially located within a corresponding one of the grooves in the sprinkler frame, the retainer connecting the fire protection sprinkler to the internal circumferential groove of the internal bore of the welded outlet or the mechanical outlet of the fluid supply conduit when the fire protection sprinkler is connected to the fluid supply conduit,
    wherein, when the fire protection sprinkler is inserted into the fluid supply conduit so as to be connected to the fluid supply conduit, the at least one sealing gasket seals against the internal bore of the welded outlet or the mechanical outlet.

2. The fire protection sprinkler according to claim 1, wherein the retainer is a spring mechanism having a diameter, the diameter of the retainer being reduced when the fire protection sprinkler is inserted into the internal bore of the welded outlet or the mechanical outlet, and the diameter of the retainer expanding to maintain pressure against the internal bore of the welded outlet or the mechanical outlet when the fire protection sprinkler is installed in the internal bore.

3. The fire protection sprinkler according to claim 2, wherein the fire protection sprinkler is removed from the internal circumferential groove of the internal bore of the welded outlet or the mechanical outlet by compressing the retainer so that the diameter of the retainer is reduced to be less than the diameter of the internal bore of the welded outlet or the mechanical outlet, allowing the fire protection sprinkler to be pulled from the internal bore of the welded outlet or the mechanical for removal of the fire protection sprinkler.

4. The fire protection sprinkler according to claim 1, wherein the retainer is located at least partially within both the corresponding groove in the sprinkler frame and the internal circumferential groove in the internal bore of the welded outlet or the mechanical outlet when the fire protection sprinkler is installed in the internal bore of the welded outlet or the mechanical outlet, in order to maintain a positive connection between the fire protection sprinkler and the internal bore of the welded outlet or the mechanical outlet.

5. The fire protection sprinkler according to claim 1, wherein the at least one sealing gasket has one or more lobes, each lobe including a sealing lobe, a recess, and an inner peripheral surface.

6. The fire protection sprinkler according to claim 1, wherein the at least one sealing gasket is a pressure sealed gasket having one or more sealing fins.

7. The fire protection sprinkler according to claim 6, wherein one side of each fin contacts the inner bore of the welded outlet or the mechanical outlet of the fluid supply conduit when the fire protection sprinkler is installed in the internal bore, and another side of each fin is exposed to water or air contained within the fluid supply conduit.

8. The fire protection sprinkler according to claim 7, wherein, when the water or air contained within the fluid supply conduit is pressurized, the water or air presses a respective sealing fin against the inner bore of the welded outlet or the mechanical outlet, improving the seal of the fire protection sprinkler.

9. The fire protection sprinkler according to claim 1, wherein the retainer is a multi-lobe retainer spring mechanism.

10. The fire protection sprinkler according to claim 9, wherein the multi-lobe retainer spring mechanism has a depending leg, an arcuate segment, and an adjoining arcuate segment.

11. The fire protection sprinkler according to claim 9, wherein the multi-lobe retainer spring mechanism is made of a material selected from the group consisting of stainless steel, music wire, cold drawn wire, oil tempered wire, and brass.

12. The fire protection sprinkler according to claim 1, wherein the retainer is oval and has an inner peripheral surface, an upper edge, and a recessed groove.

13. The fire protection sprinkler according to claim 1, wherein the at least one sealing gasket is an O-ring made of a synthetic rubber or a thermoset material selected from the group consisting of butadiene rubber, butyl rubber, chlorosulfonated polyethylene, epichloronhydrin rubber, ethylene propylene diene monomers, ethylene propylene rubber, fluoroelastomers, nitrile rubber, perfluoroelastomer, polyacrylate rubber, polychloroprene, polyisoprene, polysulfide rubber, polytetrafluoroethylene, sanifluor, and silicon rubber.

14. The fire protection sprinkler according to claim 1, wherein the at least one sealing gasket is an O-ring made of a thermoplastic material selected from the group consisting of thermoplastic elastomer styrenics, thermoplastic polyolefin LDPE, HDPE, LLDPE, ULDPE, thermoplastic polyurethane polyether or polyester, thermoplastic etheresterelastomer copolyesters, thermoplastic polyamides, melt processible runner, and thermoplastic vulcanizate.

15. The fire protection sprinkler according to claim 1, wherein the at least one sealing gasket is a notched gasket having an inner peripheral surface, an outer peripheral surface, and a notch.

* * * * *